United States Patent [19]

Livneh

[11] Patent Number: 4,763,837

[45] Date of Patent: Aug. 16, 1988

[54] FROST FREE IRRIGATION SYSTEM AND VALVE THEREFOR

[76] Inventor: Zvi Livneh, 3290 Avondale Court, Windsor, Ontario, Canada, N9E 1X6

[21] Appl. No.: 63,321

[22] Filed: Jun. 18, 1987

[51] Int. Cl.[4] .................. B05B 1/00; B05B 15/00
[52] U.S. Cl. .................. 239/111; 239/124; 239/204; 239/201; 137/505.13; 405/36; 405/37
[58] Field of Search .................. 405/36, 37, 43, 45, 405/39; 137/505.13; 239/110, 111, 124, 201

[56] References Cited

U.S. PATENT DOCUMENTS

| | | | |
|---|---|---|---|
| 1,428,553 | 9/1922 | Oakes | 239/111 |
| 1,589,252 | 6/1926 | Sherman | 239/111 X |
| 2,500,806 | 3/1950 | Dalrymple | 137/505.13 X |
| 2,768,028 | 10/1956 | Robinson | 405/37 X |
| 3,603,508 | 9/1971 | Ingram | 239/111 |

FOREIGN PATENT DOCUMENTS

| | | | |
|---|---|---|---|
| 20846 | 5/1907 | United Kingdom | 137/505.13 |
| 2178933 | 2/1987 | United Kingdom | 405/36 |
| 548242 | 3/1977 | U.S.S.R. | 239/111 |

Primary Examiner—Dennis L. Taylor

[57] ABSTRACT

In one aspect a novel valve, when used with water conveying conduits of water supply or of irrigation systems, will purge them of residual water in the conduits, when the water supply is "cut off", but will close the system when the water supply is on (e.g. there is water pressure above a predetermined threshold, or a "head" occurs). When this valve is closed the system then operates, conventionally, and for irrigation systems to eject water from water dispensing nozzles or spray heads located at or in proximity to the ground surface so that irrigation can take place. With this novel valve, the periodic (or annual) need to purge the irrigation system of residual water to clean out contaminants or to prevent winter freeze-up is avoided, since self-purging of the residual water and of any water suspended solids in the network takes place each time the water pressure in the system is reduced to approximately zero (or to below the said predetermined threshold pressure), as on each occurance of water shut off. A further embodiment contamplates a compound nozzle valve assembly formed as a single structure housing a conventional water dispensing nozzle, and the novel purging valve. Such compound nozzle valve assembly simplifies installation of the irrigation system and of its subsequent operation and maintenance.

22 Claims, 9 Drawing Sheets

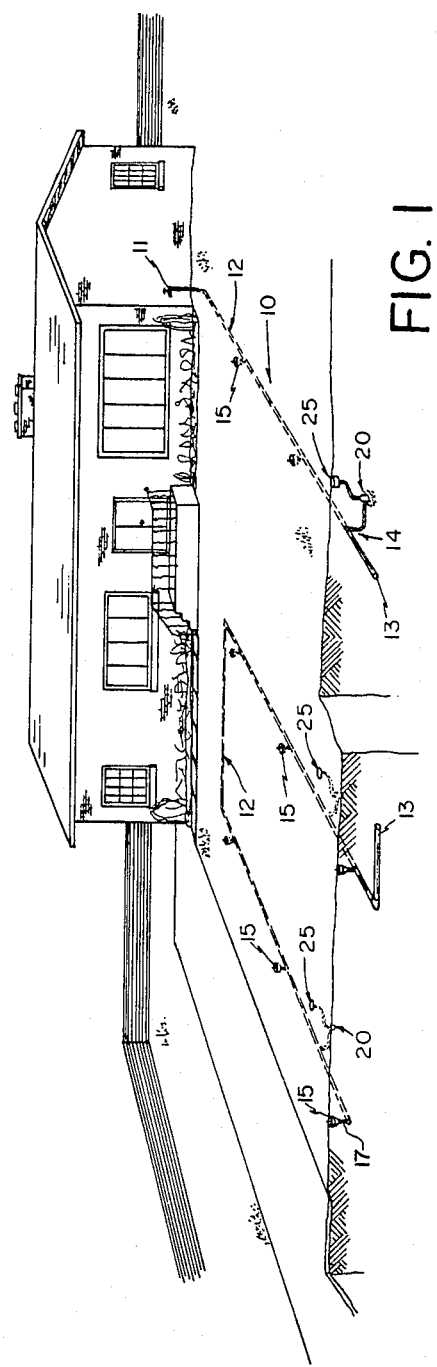

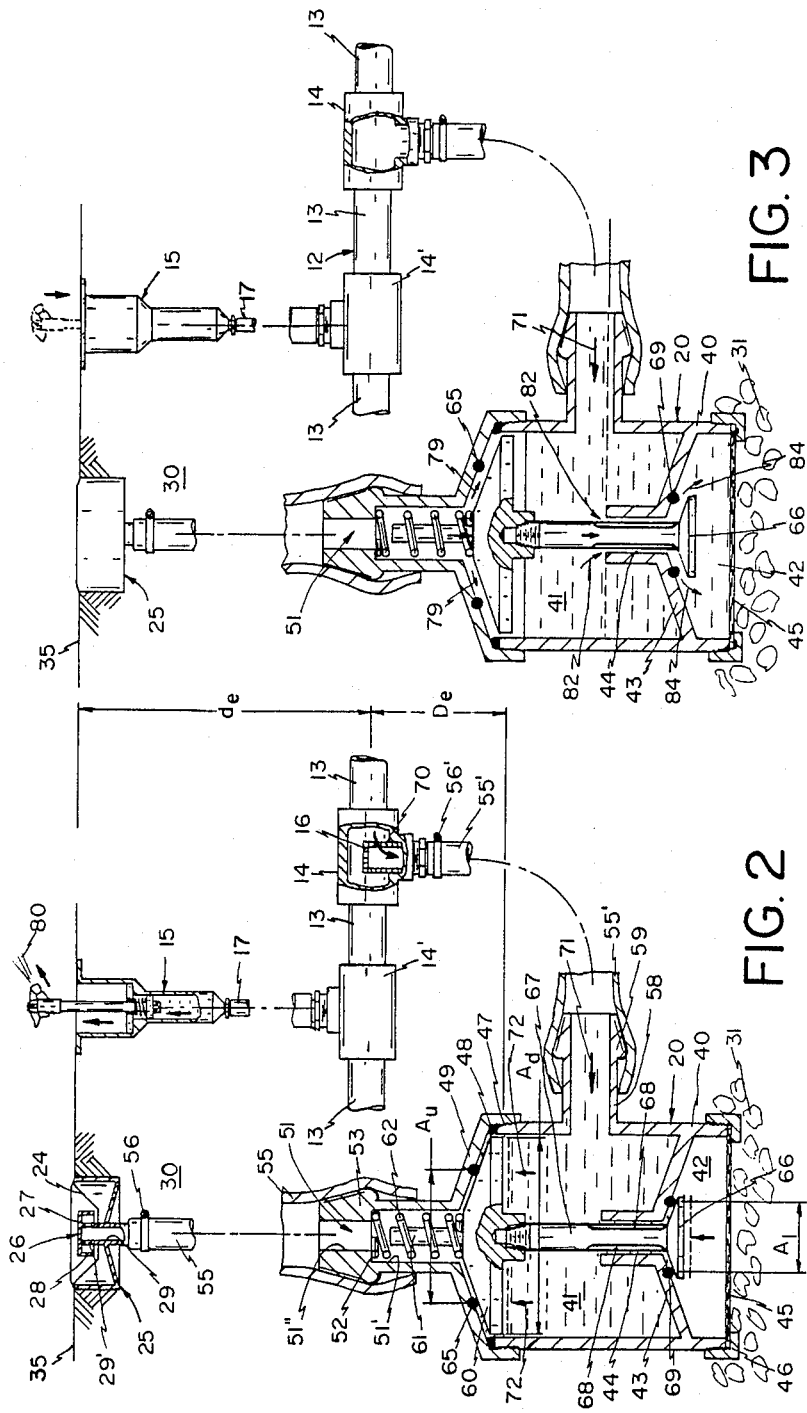

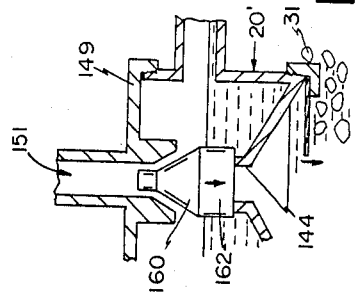
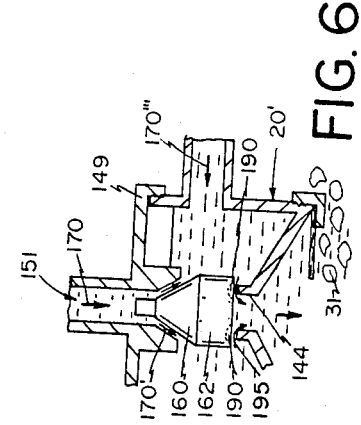
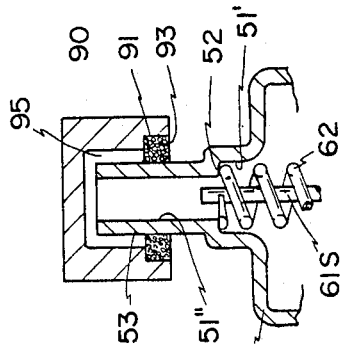
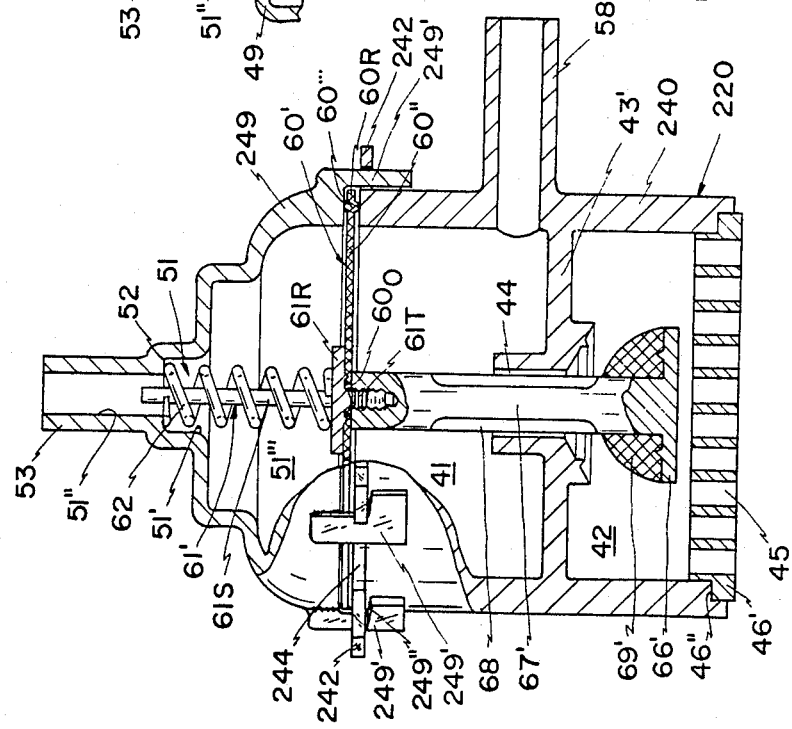

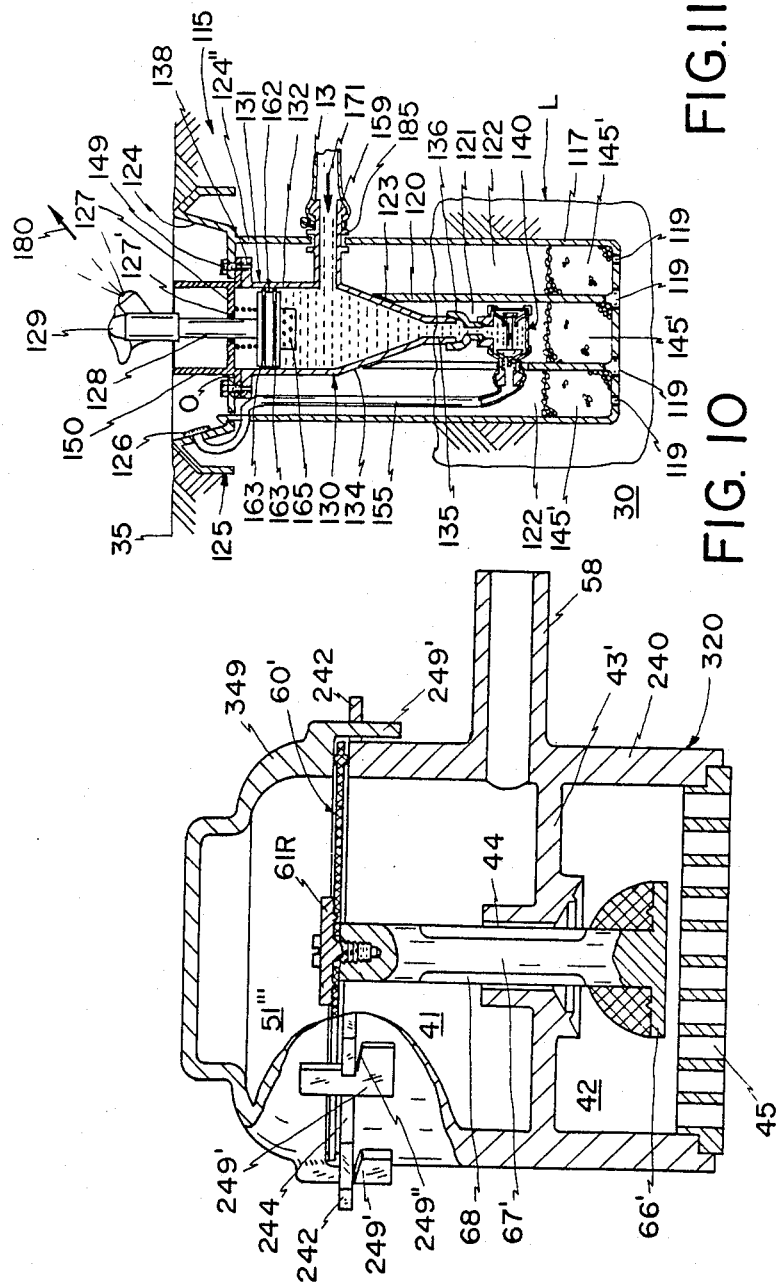

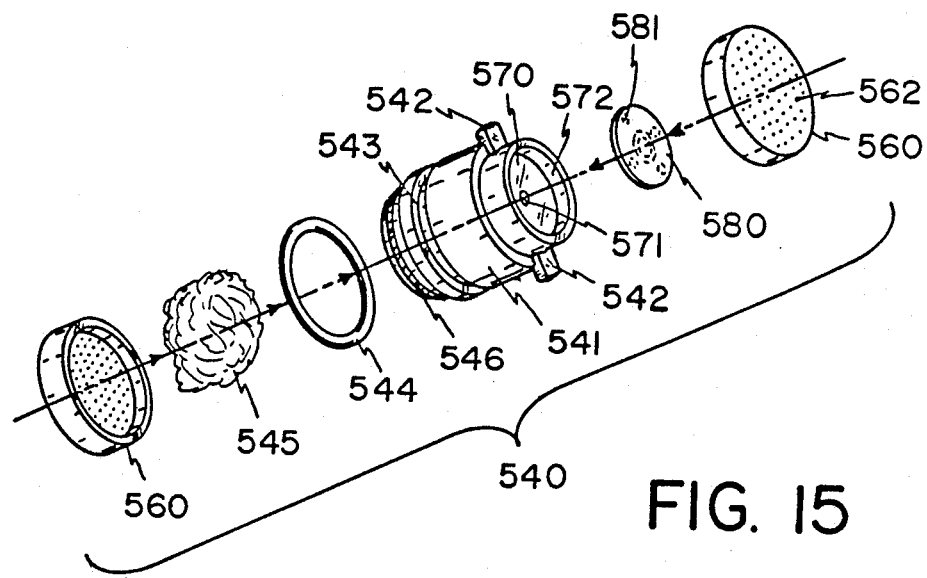
FIG. 15
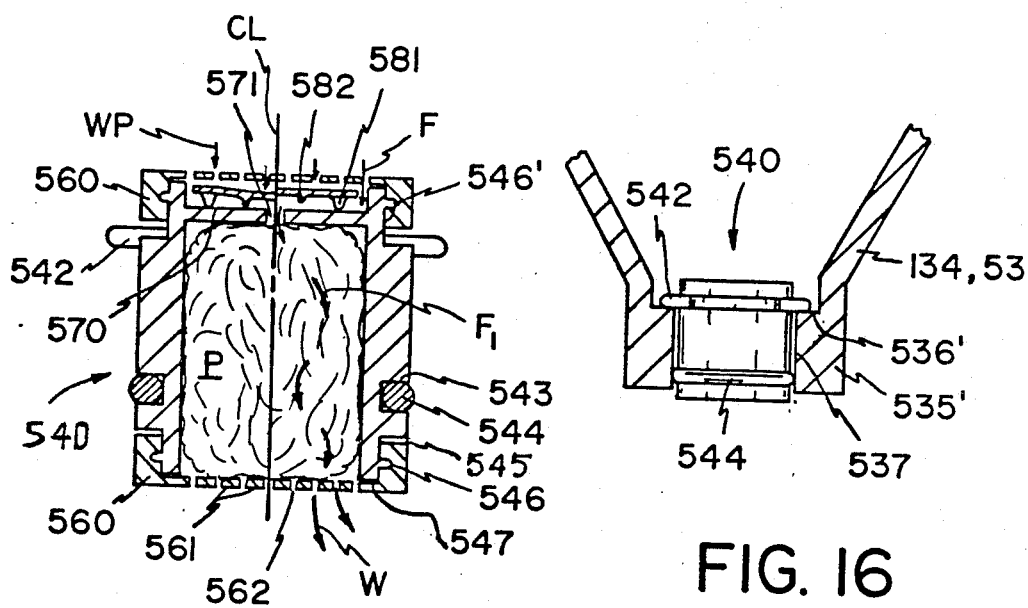
FIG. 16
FIG. 17

FROST FREE IRRIGATION SYSTEM AND VALVE THEREFOR

This invention relates to an irrigation system and more particularly to a water-purging irrigation system suitable for use in temperate climates where conditions of freezing occur. In a preferred embodiment, the invention purges water after each watering cycle. The invention further relates to a unique pressure responsive valve for water purging such irrigation systems; or even, domestic or industrial water supply systems, when the pressure therein falls below a predetermined pressure.

Irrigation systems are common for improving fertility in agriculture. Some irrigation systems have their water conveying networks disposed above the ground, others as ditches at the ground surface, and others by conduit subterraneanly disposed with uprising members and faucets or water spraying nozzles terminating the uprisers, the nozzles generally disposed either at the surface of the ground or even superadjacent thereto.

For industrial and domestic lawn care, however, subterranean irrigation systems are most popular.

In relation to subterranean irrigation systems, which will be discussed first, in order to avoid damage to the subterranean pipes and to the uprisers and to the water dispensing sprinkler heads associated therewith, that would normally occur as a result of frost action during cold temperatures common in the temperate climates during fall, winter or early spring, various techniques are or have been used to purge the system of water. One water purging technique is by blowing compressed air through the network, as those skilled in the art will know. Sometimes, after compressed air purging, the system is subsequently flooded with a liquid antifreeze as a further confirmation of a total antifreeze protection to the system.

Others have attempted to design subterranean irrigation systems so that the water conveying conduits are at significant elevations beneath the surface of the ground so as to escape frost penetration. In the upper latitudes of the temperate zone, this is impractical because frost may penetrate into the ground a meter or more in depth.

Prior art subterranean irrigation systems for temperate zones where frost action occurs, also it has been preferred that the subterranean water conveying conduits be located in a common plane. This has been particularly necessary in the temperate zone where purging of the system prior to winter is required. It will be obvious to those skilled in the art that when the surface of the ground undulates or rolls, it becomes extremely difficult (technically) to lay the subterranean water conveying network in a common plane. Such requirements also significantly escalate the initial cost of installing a common plane subterranean irrigation network.

I have conceived of a unique valve which, when used particularly with subterranean water conveying conduits of a subterranean irrigation system, the valve will purge the system of residual water in the conduits, when the water demand is "cut off", but will close the system when the water demand is on (e.g. there is water pressure above a predetermined threshold, or a "head" occurs). When my novel valve is closed the system then operates conventionally to eject water from the water dispensing nozzles or spray heads located at the ground surface so that irrigation can take place. With this novel valve, the annual (or periodic) need to purge the irrigation system of residual water to prevent winter freeze-up is avoided, since self-purging of the residual water in the network takes place each time water pressure in the system is reduced to approximately zero (or to below a predetermined threshold pressure), as on each occurance of water shut off. This valve also has the benefits as providing means to purge the system, not only of the residual water after water shut off, but of any accumulated sediments in the system as well.

In a related application of my novel purge valve, the same may be used in water supply systems of any type to purge the same of water, when the water pressure therein falls below a predetermined threshold pressure. As such, the purge valve has application for summer cottages which will "winterize" the water supply system when the water pressure is cut off as part of the winterizing operation at summer season's end.

The use of my unique valve in a subterranean water conveying irrigation system also allows the subterranean network to be located a specific distance or depth from the surface of the ground irrespective of its undulating profile and this has extreme advantages in reducing the installation time and costs and simplifies the complexity of trying to locate the subterranean conduits that would otherwise be required for proper system purging as the prior art now prefers.

The invention also has application to irrigation system which have a network of water conveying conduits, whether disposed on the surface of the ground, or in an elevation above the surface of the ground.

The invention, in one aspect, therefore contemplates an irrigation system including a network of water conveying pipes communicating to a water source, and a plurality of water dispensing nozzles, for dispensing water onto the surface of the ground, said nozzles communicating to said network whereby water from the water source is conveyed for delivery to the nozzles, the improvement comprising a relief valve means including;

(a) a hollow housing, that on the one hand communicates to the network, and on the other hand communicates to the ground at an elevation subjacent to the network (b) water pressure responsive means in said housing for diverting water flowing in the valve from the network to the ground when the water pressure in the network is below a predetermined threshold of pressure.

The invention further contemplates an irrigation system including a network of water conveying pipes communicating to a water source, and a plurality of water dispensing nozzles, for dispensing water onto the surface of the ground, said nozzles communicating to said network whereby water from the water source is conveyed for delivery to the nozzles, the improvement comprising a relief valve means including;

(a) a hollow housing partitioned to define a first and a second plenum, said second plenum communicating with the surrounding ground, the first plenum communicating with the network;

(b) a channel communicating between both plenums;

(c) a valve member disposed in one of said plenums and responsive to the ambient pressure of the water in said first plenum whereby to close the channel when the water pressure in said first plenum is above a predetermined threshold pressure, and to open said channel when said pressure is below said threshold pressure whereby residual water in the network and in said first plenum is drained through the channel into the second plenum and, thence, discharged into the ground.

The invention further contemplates a method of purging water from an irrigation system that includes a network of water conveying conduits, communicating to a source of water, and a plurality of water dispensing nozzles that make water communication to the network, for delivery of water to the surface of the ground comprising the steps of;
 (a) locating a drainage orifice, to said network, at an elevation subjacent to that of the network, and
 (b) opening the drainage orifice when the pressure of water in said network is below a threshold pressure, so that the water in the network is diverted, by gravity, through the discharge orifice and wasted.

In each of the aforesaid embodiments, the invention also has application when the network of water conveying conduits are disposed subterranean, or at or above the surface of the ground.

In yet a further embodiment the invention contemplates an article of manufacture, a water relief and drainage valve for a subterranean irrigation system, the valve comprising;
 (a) a hollow housing partitioned to define,
  (i) a first water holding plenum;
  (ii) a second water discharge plenum including a discharge orifice whereby water in the second plenum is discharged therefrom;
  (iii) a channel communicating between both plenums whereby to convey water from the first plenum to the second plenum and hence, to discharge the same from the system;
 (b) a valve member disposed in one of said plenums and responsive to the ambient pressure of water in said first plenum whereby to close the channel when the water pressure in said first plenum is above a predetermined threshold pressure, and to open said channel when said pressure is below said threshold pressure, whereby residual water in the network and in said first plenum is drained therefrom through said channel into the second plenum and thence discharged into the ground.

The invention further contemplates as an article of manufacture, a water relief and drainage valve for an irrigation system, the valve comprising;
 (a) a hollow housing partitioned to define,
  (i) a first water holding plenum;
  (ii) a second water discharge plenum including a discharge orifice whereby water in the second plenum is discharged therefrom;
  (iii) a channel communicating between both plenums whereby to convey water from the first plenum to the second plenum and hence, to discharge the same from the system;
 (b) a valve member disposed in said plenums and responsive to the ambient pressure of the water in said first plenum, the valve member including an upper flexible valve surface attached to the housing and extending through said first plenum to sealingly partition the said first plenum into an upper air accommodating subplenum, and a lower water accommodating subplenum;
  (i) the housing further defining a water conveying orifice communicating to the water accommodating subplenum, whereby the water accommodating orifice is adapted to be connected to the subterranean irrigation system;
  (ii) the housing further defining a second air venting orifice communicating with the upper air accommodating subplenum, whereby the air orifice is adapted to be continuously vented to the atmosphere;
 (d) a stem, with lower distal end, depending from the flexible valve membrane and extending through the channel, the stem of a diameter slightly smaller than that of the channel, whereby water in said water accommodating subplenum may flow past the stem, through the channel, into the second plenum, a valve head carried by the stem at the lower distal end of the stem and positioned so as to make urging closing contact against the channel and to sealingly close the same when the flexible membrane is deformed as a result of a differential in pressure across the flexible membrane as when the pressure in said water accommodating subplenum greater than that in said air accommodating subplenum.

The invention also contemplates a compound nozzle and valve member suitable for use with an irrigation system and for draining the system of residual water, including water suspended solids, when the pressure of the water therein is below a predetermined pressure, the compound member comprising:
 (a) an essentially hollow rigid water containing body including;
  (i) an upper hollow water containing chamber defining;
   (1) a first water inlet channel adapted for communication to a source of water supply and for conveying water into the chamber;
   (2) a second water dispensing channel for conveying water, within the chamber, onto the surface of the ground for irrigation thereof;
   (3) a third water waste channel, disposed subjacent to both to both first and second channels;
  (ii) a water pressure sensitive valve housing a movable valve member, and communicating with the third waste channel, the valve member responsive to open the valve, when the water pressure within the chamber member is below a predetermined pressure, thereby to drain said chamber of water, and to close the valve when the water pressure in said chamber member is above said predetermined pressure, thereby inhibiting water from draining from the chamber member through the third channel, and thereby forcing water into said second water dispensing channel.

Additionally, the invention comtemplates a water sensitive valve within the compound nozzle that comprises an open ended housing defining:
 (a) a first water inflow orfice;
 (b) a second water outflow orfice communicating with the first water inflow orfice;
 (c) the housing extending near the first water inflow orifice into a surround circumscribing the first water inflow orifice and defining between that orifice housing a bearing surface;
 (d) a resilient flexible sheet positioned over said first water inflow orifice;
 (e) means for mounting said sheet, in a position upstream from said first water inflow orifice and in close proximity with said bearing surface whereby when water pressure reaches a certain predetermined threshold, the flexible sheet flexes to urge against the first water inflow orifice and to close off the same.

The invention will now be described by way of example with reference to the accompanying drawings and particularly to a water conveying network, subterraneanly disposed, since such subterranean irrigation systems are generally to be preferred.

FIG. 1 is a perspective view, partially in section, of a subterranean irrigation system according to my invention.

FIGS. 2 and 3, respectively, are elevational sectional views through one embodiment of my novel water purging valve showing its operation during irrigating water flow and immediately after irrigation shut down and during network self purging.

FIGS. 6 and 7 are partial sectional views of the valve of FIG. 5 depicting its operation during purging and immediately subsequent thereto.

FIG. 8 is a sectional view of yet another embodiment of my invention.

FIG. 9 is a cross-sectional view of the upper portion of valve of FIG. 8, showing a novel venting cap for the same.

FIG. 10 is a sectional view of yet another embodiment of my valve which does not require venting.

FIG. 11 is a section, in elevation, of a novel compound nozzle valve assembly, according to my invention, housing a water dispensing nozzle, and a water purging valve; while

FIG. 15 is an assembly view of this further embodiment employing a flap operative member within the cylindrical valve.

FIG. 16 is a section through the cylindrical valve member, in situ, within the irrigation head member 130 of FIG. 15.

FIG. 17 is an elevational sectional view of the valve of FIG. 15.

Figure 5:
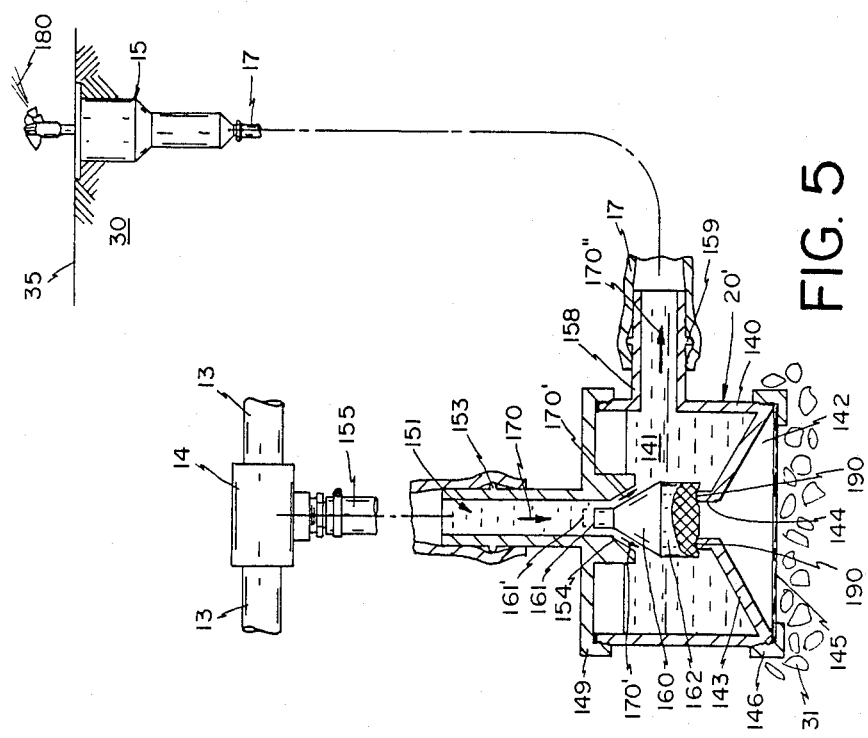
FIG. 5 is a section in elevation through yet a further embodiment of my valve, showing its operation during irrigation.

Referring to FIG. 1, a subterranean irrigation system 10, is shown, traversing in a typical fashion, the front lawn of a domestic dwelling. A water source 11 to the system 10 makes communication with a subterranean water conveying network 12 which is composed of pipe segments 13, T's 14, flush mounted water ejecting or spraying nozzles 15, each of which make a fluid connection through uprising pipes 17 to one of the subterranean T fittings 14, as more clearly seen in FIG. 2. The system 10 typically has a plurality of water spraying nozzles 15 as shown in FIG. 1 so as to irrigate the whole lawn.

In my subterranean network embodiment, it is preferred that the network 12 be located at a shallow depth, $d_e$, as seen in FIG. 2, from the surface 35 of the ground 30, and that my novel valve 20 be located at, or subjacent to the network by a dimension $D_e$ that is greater than zero (see FIG. 2). Typically, the dimension $d_e$ be about 5 cm and that $D_e$ be any convenient dimension as will become more apparent hereafter.

Referring now to FIG. 2, the valve 20 includes an open ended cylindrical housing 40 with inner diameter $A_d$ that is partitioned into an upper and a lower plenum, 41 and 42 by an uprising conical wall 43 that transforms into an uprising central channel 44, that acts as means to communicate the lower plenum 42 with the upper plenum 41. The bottom of the lower plenum 42 is open to the ground 31 beneath it. This ground 31, preferably, if the general surrounding ground 30 itself is not of high porosity, is back filled with gravel or sand as shown to provide a zone of high porosity 31 in juxtaposition with the lower plenum 42 of the valve 20. In order to prevent the sand or gravel 31 from working into the lower plenum 42, a porous membrane 45, such as a wire mesh or inert porous filter medium, extends across the plenum opening. The porous membrane 45 is secured there, by an annular threaded ring 46, that threadingly mates, as shown, to corresponding threads formed circumferentially about the bottom of the cylindrical housing 40.

A frusto-conical top piece 49 closes the upper plenum 41, but defines through its centre a stepped bore 51 with a lower major bore 51' and an upper minor bore 51", the former communicating directly to the upper plenum 41. A seat 52 is formed at the junction of the two bores. The minor bore 51", makes appropriate communication via a flexible vent pipe or channel 55 to a vent 25 mounted at the surface 35 of the ground 30. The flexible pipe 55, is press fitted over the minor bore 51" upper opening because the bore exterior forms a circumferential bulbous collar 53 over which the flexible pipe 55 urgingly, sealingly attaches. The upper end of the pipe 55 is clamped by a clamp 56 to the base of the vent 25.

The vent 25 defines a septum generally shown as 26 that vents the pipe 55 and, hence, the bore 51 to the atmosphere. This septum 26 consists of an upper cap 27 with a circumferentially depending margin 28 and a centrally located vertically disposed channel 29 that defines at least one, preferably two, oppositely disposed lateral orifices 29' for communicating the channel 29 to the atmosphere. The septum 26 is placed in a well 24 which is defined by the housing of the vent 25. In this way, the septum is protected from surface travelling vehicles, such as lawn mowers and the like and is reasonably isolated from dirt, mud and small insects which would tend to clog the vent. It is to the depending lower end of the channel 29 that the vent pipe 55 and the overriding restraining clamp 56 attach.

Refer now to the valve 20; within the upper plenum 41, floats a frusto-conical piston 60, of diameter slightly smaller than diameter $A_d$. The piston 60 has an upwardly projecting stud 61. A coil spring 62 is placed over the stud 61 and urges between the upper surface of the frusto-conical piston 60 and the seat 52 to act as a biasing means urging the piston 60 downwards. An annular O ring 65 with diameter $A_u$ is mounted in a circumferential recess in the underside surface of the frusto-conical cap 49 as shown. The cap 49 is attached to the cylindrical housing 40 as by threads 47 which mate with corresponding threads in the outer wall of the housing 40, and a water impervious sealant 48 is placed at the juncture of the cap 49 and the cylindrical housing 40 in order to provide a total water tight seal.

When the piston 60 is urged against the O ring 65, as in FIG. 2, any water in the plenum 41 is inhibited from by-passing the O ring 65 and escaping out of the vent 25.

Depending from the frusto-conical piston 60 is a stem 67 which defines midway therealong and toward its distal end, a plurality of vertically positioned, radially disposed flutes 68. The stem 67 terminates at its distal or lower end into a frusto-conical valve head 66. As seen in FIG. 2, a frusto-conically formed partitioning wall 43 divides the plenums 41 and 42, but provides communication between them through an upstanding cylindrical aperture or channel 44. It is through this channel 44 that the fluted portion of the stem 67 extends. The underside of the frusto-conical wall 43 has a recess channel into which a second O ring 69 is placed; that O ring having a diameter $A_l$, that is smaller than the diameter $A_u$.

The housing 40 defines through its circumferential wall a channel communicating opening 58 that has an outwardly projecting circumferential bulbous collar 59 over which a second flexible pipe 55' is attached. The other end of that pipe 55' makes connection to one of the T's 14 of the water conveying network 12.

Water will flow from source 11 through pipe segments 13 of the network 12 and through the various T's 14. (Each T may have positioned within it, a filter screen 16 or other device in order to filter the water, although that is not always needed.) Referring to FIG. 2, water will flow according to arrows 70 and 71 from the T14 through flexible pipe 55' into the first plenum 41. The pressure of the water flowing into the first plenum 41 will urge against the underside of the piston 60 as illustrated by arrows 72 and will push the piston 60 into urging contact with the upper O ring 65 so as to sealingly close the plenum 41 from the vent 25. Simultaneously, due to the precise extent of the stem 67, and hence the location of the frusto-conical valve member 66, the valve member 66 will urge against its O ring 69. Water in plenum 41 that would have thus escaped through channel 44 along flutes 68 into plenum 42 is sealed off. So long as water is flowing through the system 12, the sprinkler heads 15 will function and water will flow out, for instance, the second T 14' up pipe 17 and out the water discharge or nozzle 15 (arrow 80); irrigation occurs. When the water source is turned off, the inherent pressure in the system will continue to cause water to flow out sprinkler heads 15 until that point in time when there is insufficient water pressure within the system 12 to cause further water to flow out of the heads 15. Thus, the pressure provided by the water in the first plenum 41, according to arrows 72 will have diminished and, since the upper portion of the piston 60 is vented to the atmosphere, atmospheric pressure together with the biasing of spring 62, will force the piston 60 downward from the solid position of FIG. 2 to that of FIG. 3, thereupon, simultaneously unseating the valve head 66 in the second plenum 42 from its O ring 69.

Referring now to FIG. 3, which illustrates water purging of the system immediately after water supply shut off, when the water pressure has deteriorated sufficiently as has already been elucidated to, the water from the pipe segments 13 will flow into the valve 20, as illustrated by arrow 80, and into channel 44, down along the flutes 68, illustrated by arrows 82, and into the second plenum 42, as illustratated by arrows 84, to subsequently flow across the porous membrane 45 into the surrounding porous ground or gravel 31.

It should now be appreciated that the valve 20 will open (position of FIG. 3) or close (position of FIG. 2) at any preferred head pressure of water flow depending upon the difference in diameters $A_u$ and $A_l$, relative to that of $A_d$, and upon the dimension $(d_e+D_e)$ relative to that of $D_e$ for any given water pressure. When the coil spring 62 is used the K factor of the spring also has to be considered. Thus, for good purging (unseating of the valve head 66 from the O ring 69) I prefer $D_e$ to be at a dimension 3-6 cm. while that of $D_e$ to be at 1-3 cm. so that the total depth $(d_e+D_e)$ is about 4-10 cm. This also allows easy installation of the network 12.

As seen in FIG. 1, a number of valves 20 may be located in the network 12 and they may be conveniently located as required. The network 12 itself may follow the profile and undulating contour of the surface 35 of the ground 30. The locations of the valves 20 are selected so that they are at a lower or the lowest elevation relative to any other part of the network 12. Thus, when the network 12 itself undulates in elevation, in response to the surface 35 contour of the ground 30, (eg. the network 12 cannot be disposed in a common plane) there is always self-purging of the system 10, each time water shut-off occurs.

Figure 4:
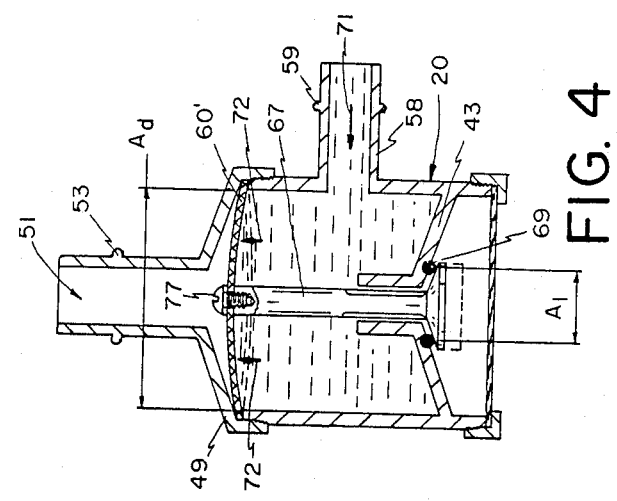
FIG. 4 is a section in elevation through an alternative embodiment of my novel valve.

Referring now to an alternative embodiment of valve 20 and to FIG. 4, the rigid upper piston 60 is replaced with a flexible membrane 60' wedged between the cap 49 and the upper portion of the housing 20 as illustrated. Central of the flexible membrane 60' is a screw 77, which threads into the upper extent of the stem 67. That valve 20 functions in identical fashion to that embodiment illustrated in FIGS. 2 and 3 and earlier described.

Referring to FIGS. 2, 3 and 4, it will be noted that the O rings 65 and 69 are mounted respectively on the undersurface of the cap 49 and of the uprising frusto-conical partitioning wall 43. This ensures, during purging, that a flushing or cleaning action occurs when the valve is open, as in FIG. 3, allowing self-removing of grit and, hence, a washing off continually of the O ring 69 as the water 84 flows thereby; in relation to O ring 65 the "air" flowing down the vent 25 through the bore 51 (arrow 79) past the O ring 65 causes flushing, while also providing air into the upper plenum 41 for full purging of the system 12, as earlier described. It should be noted that sometimes, during initial flooding of the valve 20 (during the upward movement of the piston 60—see FIG. 2) a small amount of water floods into the bore 51 and the vent channel 55. During purging, FIG. 3, this water flows back down the channel 55 and bore 51 and washes, arrows 97, past the upper O ring 65, as well, cleansing the same, thereafter, to flow out the valve with the residual network water, as earlier described.

Referring now to FIG. 5, and a further embodiment of the valve 20, the same is shown in an elevational section as valve 20'. It is structured almost identical to the valve 20 of FIGS. 2 and 3. Thus, the valve 20' has a cylindrical housing 140 of uniform inner diameter, partitioned into an upper and lower plenum 141 and 142, by an uprising partitioning conical wall 143, that transforms into an uprising central channel 144 which provides communication between the upper plenum 141 and the lower plenum 142. The bottom of the lower plenum 142 is open to the ground 31 beneath it. This ground, preferably as well, is of high porosity, for instance sand or gravel. In order to prevent the sand and gravel 31 from working into the lower plenum 141, a porous membrane 145, such as a wire mesh or porous filter media, or sponge, extends across the plenum opening. The porous membrane 145 is secured there, by an annular threaded ring 146, that threadingly mates, as shown, to corresponding threads about the bottom of the cylindrical housing 141.

The upper plenum 141 is closed off with an annular cap 149, that defines therethrough, at its centre, a channel 151 of uniform bore. The upper portion of the channel 151 makes connection with a flexible pipe 155 that is connected directly to one of the water conveying T's 14 of the water conveying network 12. Hence, water flows directly from the water source 11 through the T14, in the direction of the arrow 170, into the first plenum 141 and past a float valve 160, frusto-conically formed as shown, so that its top has an upward projecting stud 161 for centering the float 160 relatively in coaxial alignment between the channels 151 and 144. The channels 151 and 144 are preferably aligned along a common centre line. The float 160 has a base or skirt 162 with an essentially flat bottom and preferably has a specific gravity less than 1, approximately 0.95 to 0.50, so that it tends to "float" in the residual stagnant water in the first plenum 141. The float 160, however, is made of slightly deformable material, such as that known as Epichlordohydrin ® sub. nom. ECH ® available from Thomas-Gordon Limited of Mississauga, Ontario, so that when the water flows from the T 14, as when irrigation takes place, into the first plenum 141, the water will flow through the bore 151 in the direction of the arrow 170, and passes through the frusto-conical space 154 between the upper portions of the float float 160 (arrows 170') and the cap 149. This water flow pushes the float 160 downward so that the bottom of the float urges against the upper extent of the upper peripheral or rim of channel 144. The base of the float 160 is slightly resilient (a durometer range of 75 to 85 is acceptable) and it will deform, as at 190, and provide a perfect "seal" isolating plenum 141 from 142. This inhibits any water flowing from the first plenum 141 into the second plenum 142. Hence, the water 170' that flows into the plenum 141, past the float 160, will flow out conveying channel 159 into the water conduit 17, then into the sprinkler head 15 and out as a water irrigation spray 180, as shown. When the head pressure in the system 12 drops, as when the water supply 11 is turned off, the volume of water 170 passing through the frusto-conical space 154 drops and because of the specific gravity of the float 160, the float moves upwards and tends to find itself in the position shown in FIG. 6 which is a transition draining position. In this position, the upper portion of the stud 161 of the float 160 almost reaches the phantom position of 161' of FIG. 5, but not quite, hence, water will be drained out of the pipes 13 and T's 14 of the whole system 12 into the first plenum 141. Referring, still to FIG. 6, water will flow from the first plenum 141 through the channel 144 into the second plenum 142 (arrows 195) for discharge into the subjacent sand or gravel 31 where it is drained away. Thus, the residual water in the network 12 is removed. When purging is complete, referring to FIG. 7, the float 160 rests on and seals closed the channel 144. Some residual water will thus remain in the valve 20', but its volume is insignificant to cause any problems on freeze up.

Those skilled in the art will now appreciate that this particular novel valve 20' does not require a special equalizing vent 25 as required according to the earlier embodiments disclosed because venting to the atmosphere occurs in the reverse from the spray nozzle 15 down the upriser 17 to the valve 20'.

Referring to FIG. 8 and yet another embodiment of a purge valve, the same is shown as 220. The purge valve 220 defines three plenums 51''', 41 and 42, and consists of an open ended cylindrical housing or body 240 with a water inlet orifice or channel, 58, having bulbous distal end 59, that communicates to plenum 41. The valve 220 has a removable cap 249, formed as shown, with a plurality of L-shaped, circumferentially disposed, depending finger members 249 which act as latches. The body 240, has about its upper extent or rim, a plurality of radial flanges 242 with circumferential slots 244 disposed between adjacent radial flanges 242. The undersurface of each radial flange 242 acts as a bearing surface for each of the corresponding L-shaped fingers 249'. Thus the upper edge 249'' of each finger 249' is slightly inclined to allow for nesting and urging against the undersurface of each of the flanges 249. Thereupon, the cap 249 is constrained in tight engagement onto the cylindrical housing 240. A circumferential slot, not clearly seen, is molded in the upper rim of the housing, and a similarly corresponding circumferential slot is defined in the lower perimeter surface of the cap 249 so that when the cap 249 and body 240 are mated, the slots accommodate a nesting O ring 60''' therebetween to provide a water tight seal.

Preferably the O ring 60''' is integrally formed, as part of a flexible membrane member 60' as a circumferential intergral bead 60'''. The membrane member 60' defines a central aperture $60_o$, a flexible annular membrane 60'' between the aperture $60_o$ and the bead 60'''. Thus when the cap cupola 249 is affixed onto the cylindrical housing 240, the bead 60''' provides a water tight seal for the interior of the valve 220, and the flexible membrane 60'' member partitions the two plenums 51''' and 41.

The cupola cap 249, at its apex, defines a stepped bore, generally indicated as 51 with a lower minor bore 51' communicating with the plenum 51''', and an upper minor bore 51''. At the transition point or step 52 between major and minor bores 51' and 51'', the same acts as a seat 52 for one end of a biasing coil spring 62. A bulbous surround 53 terminates the upper extent of the bore 51 in a manner as earlier described with reference to the earlier embodiments. Thus plenum 51''', is vented to the atmosphere through an appropriate vent channel 55, or 155 as the case might be.

There is an upper stud 61' formed as a lower depending threaded piece 61T, an upwardly projecting spring guiding shaft 61S, and a radially projecting flange 61R, disposed therebetween. The flange 61R acts as the lower spring seat for the coil spring 62, and the guiding shaft 61S acts as a means for constraining the coil spring 62 between each of its opposite seats 61R and 52. The annular flange 61R rests on top of the central portion of the flexible annular membrane 60'' while the threaded piece 61T extends through the central aperture $60_o$ and threadingly mates into the upper end of a lower stud or stem 67'.

The stem 67' defines, radially, a plurality of vertically disposed recessed channels 68. The housing 240 defines a radially inwardly projecting partitioning wall 43' that defines a central aperture 44 sized with a diameter slightly larger than that of the stem 67' so that the stem 67' slidingly travels and extends therethrough into the lower plenum 42. The lower distal end of the stud 61' extends as at 66' into a radial flange. A semi-spherical annular rubber seal 69' rests on the flange 66'. The lower distal portion of the channel 44 flares into the lower plenum 42 so that when the valve is in its closed position the semi-spherical rubber seal 69' urges against the flare to close the channel 44 and perfect water sealing between upper and lower plenums 41 and 42.

The lower plenum 42 is separated from the surrounding ground 30 by a porous membrane 45 affixed to an annular ring 46' defining an annular step 46" in its perimeter. When this ring 46' is made of deformable material, it will snap in and latch to close to the lower end of the housing 240 and will isolate the plenum 42 from the surround or ground 31. This particular embodiment has features over previous embodiments of the venting valve disclosed by virtue of the fact that it may be disassembled and assembled simply by hand, without the use of any tools, thereby to clean and service the interior of the same.

In some applications, where the ground is granular, extremely porous, or air entrained, or venting the plenum directly to the atmosphere by use of the venting channel 55 and vent 26 can be avoided when a venting cap 90 is used. Referring to FIG. 9, the venting cap 90 is fitted over the bore 51. The venting cap 90 is composed essentially of an upright cylinder whose radial lip is stepped at 91 so as to accommodate an annular porous membrane, or sponge 93 thereat. The vent cap 90 is placed over the end of the bore 51" as shown, to leave an annular air-free channel 95 as communication with the bore 51" and the membrane 93 to the surround. Thus some equalization of air in the plenum 51''' will take place. This vent cap 90 may be used with any of the valves earlier disclosed if the surrounding ground 31 is porous enough (air entrained) or if the purge valve is used with an above ground water conveying network 12. It eliminates the cumbersome need of a vent channel 55 communicating to a vent 26 mounted at the surface of the ground as described with reference to various earlier figures.

A further embodiment of purging valve is that of FIG. 10. The valve 320 of FIG. 10 is, in almost all respects, similarly structured as the valve 249 shown in FIG. 8, save and except the upper cupola cap 349 is solid and the venting bore 51 is totally eliminated. Thus, the upper most plenum 51''', is totally isolated from the ground, and surround, and the atmosphere. In this embodiment of purging valve the factors of the elasticity for the membrane 61', and of the spring 62 are more critical than for the equivalent elements of the other valves because the plenum 51''' is not communicated to the atmosphere.

Referring now to FIGS. 11 through 14, and a novel compound nozzle valve assembly, the same is generally indicated as 115. There is an outer cylindrical ground engaging housing 117 defining, in its bottom, a plurality of water draining orifices 119. The ground engaging housing 117 itself defines, intergally therewith, an interiorally centrally uprising cylindrical piece 120 so as to partition the lower portion of the housing 117 into an inner cylindrical region 121 and an outer annular region 122. The upper margin of the central uprising cylindrical piece 120 terminates at a bevelled surface 123 that acts as an annular nesting ring or seat for a compound nozzle and valve member generally shown as 130.

In the lower portion of the regions 121 and 122 is a water porous and earth filtering media 145', shown in the figures as a bed of glass beads. Any other granular material could suffice so long as the diameter of the material is larger than the size of the water draining orifices 119 to thereby prevent their escape into the ground. Other than glass, typically other inert spherical members such as plastic beads or even small stones could be used.

The compound nozzle and valve member 130 incorporates both functions of the water dispensing nozzle 15 and of the relief and water purge valve 20 of my previous embodiments. Thus, member 130 has a hollow body 131 that is formed as an upright cylindrical housing 132 whose base transforms into a frusto-conical section 134 defining at its apex and a depending water conveying channel 135. Midway along the cylindrical housing 132, there is provided a radially outwardly extending annular flange 138 that defines threaded screw accommodating orifices 139; the extent of the cylindrical housing 132 projecting above this annular radial flange 138 is referenced 150.

A flexible hose 136 is form fitted over the end of the channel 135. The hose 136 communicates to a subjacent water purging valve 140, through an accommodating water inlet orifice 158. The purge valve 140 has a water relieving orifice 142 on its right hand side, and an air relief orifice 151 on its left hand side; the latter communicates to the ambient atmosphere at ground level 35 through means of a venting conduit 155 to an atmospheric communicating vent 126.

The valve 140 may be of identical construction as dislcosed in any of the earlier valves shown in FIGS. 1 through 8 of this disclosure; however, it is disposed so that the water communicating channel is in the vertical. Thus the valve of FIGS. 5 through 7 could be used in the elevational profile indicated in those figures or the valve of FIGS. 2 through 4 or 8 could be used provided each was rotated, in the plane of the drawing sheet, counter-clockwise through 90° so that the water inlet channel (58) of those FIGS. 2 through 4, and 8 would be disposed in the vertical to thus make a water communicating connection with the body 130. The upper extent 150, the prolongation of the upright cylinder 132, extends from, on the one hand, an inwardly projecting radial flange 127 that defines a central aperture 127', and on the other hand, the outwardly projecting radial flange 138. The inner radial flange 127, therefore, acts as an upper stop plate and as a partitioning member defining the internal water containing region of the body 131, as will now be described.

Extending through the aperture 127' is a hollow nozzle stem 128, the upper distal end of which makes water communication through a water dispersing nozzle 129 for the ejection of water 180 for irrigating the ground. The lower or proximate end of the nozzle stem 128 communicates through a slidable piston 162 that has two radial recesses about its perimeter to accommodate a pair of O rings 163 all of which is sized to thereby provide a water sealing arrangement between the movable piston 162 and the inner wall of the upright cylinder 132. To the under surface of the movable piston 162 is a water filtering screen network 165 to provide screening of any contaminants suspended in the water containing region in the body 131. Thus, depending upon the volume of water flow, as indicated by arrow 171 in FIG. 11, into the water containing region of member 130, the actual physical location of the piston 162 within the body 131 will, rise with water flow and, hence, move the nozzle head 129 up into an elevation above the surface 35 of the ground 31 as water flows through the stem 128, past the piston 162. Water 180 is ejected from the nozzel 129 and there is irrigation. The piston 162 is stopped at its upward limit by the underside of the inner radial flange 127.

When the irrigation system is closed off, in a manner as described with reference to the earlier embodiments, the back pressure of the system will still cause water to flow out of water nozzle 129, arrow 80. When the water pressure within the water containing region of the body 131 is reduced to or below a predetermined level, in a manner as earlier described, the relief valve 140 will open, as in FIG. 11B, and will drain the water containing region of member 130 of water; flooding the lower granularly filled regions 121 and 122 with water, which then percolates and drains through orifices 119 into the subjacent ground 31.

Figure 14:
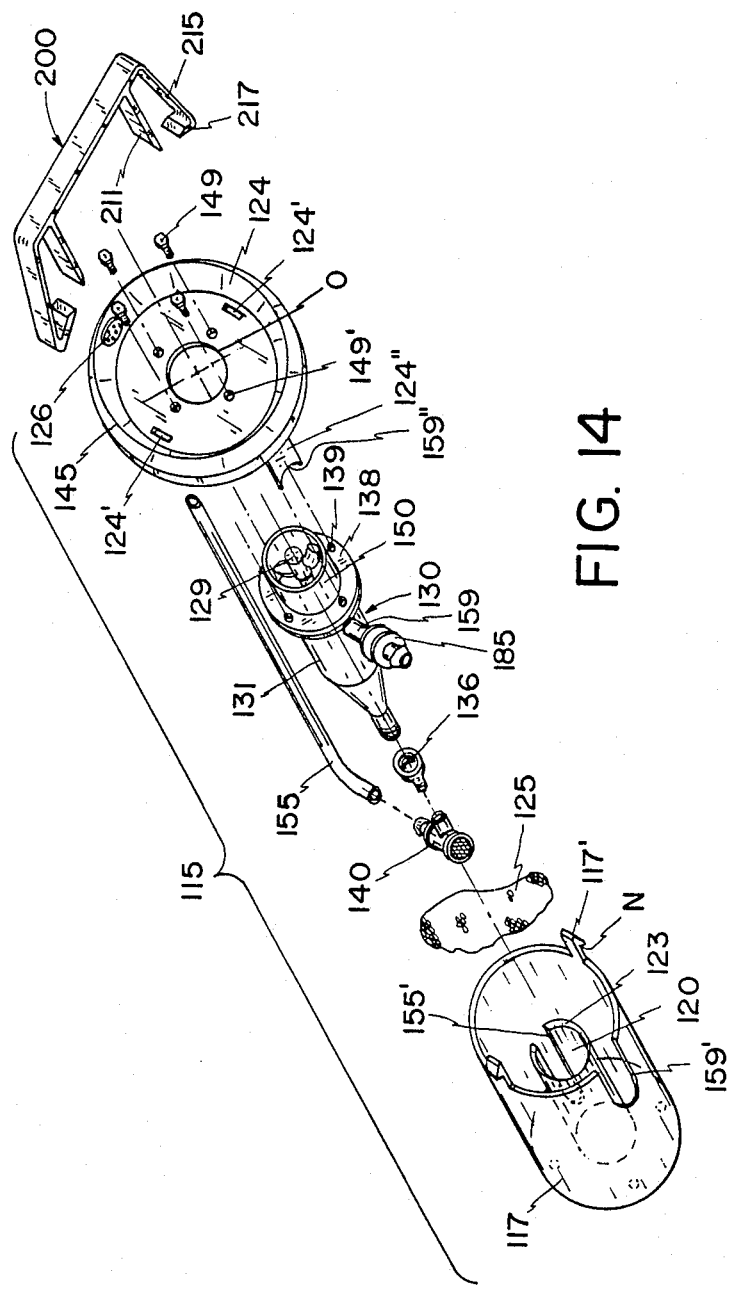
FIG. 14 is an assembly view of the compound nozzle valve assembly of FIGS. 8 through 10.

Referring to FIG. 14, the annular vent ring 125 has apertures 149' through which threaded bolts 149 extend into accommodating threaded apertures 139 engraved into the radial flange 138. Thus, the body 130 is fixedly attached to the annular vent ring 145. The annular vent ring 145 defines at least two diametrically positioned slots 124' in its lower floor.

Figure 11A:
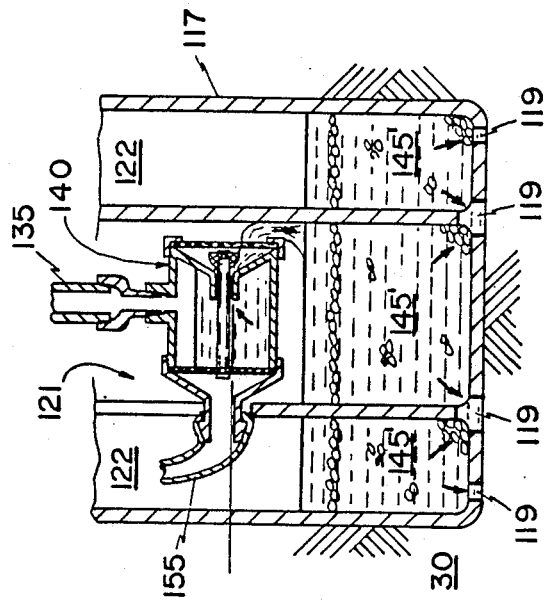
FIGS. 11A and 11B are equivalent sectional views, but only of the lower portion of the assembly, and that is generally designated L in FIG. 11.
Figure 11B:
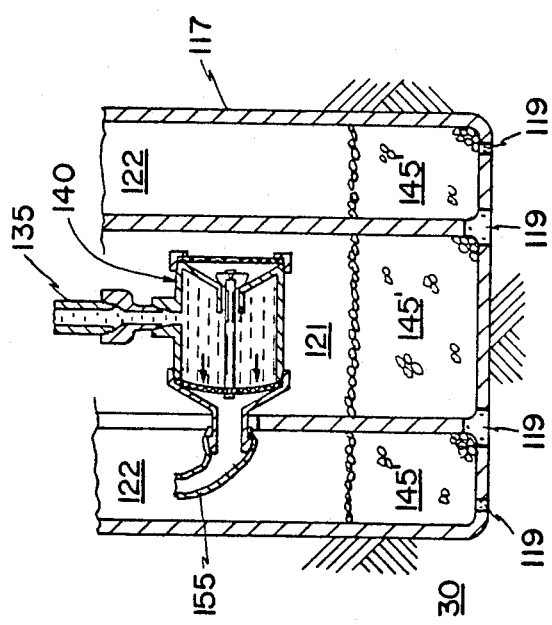
Figure 13:
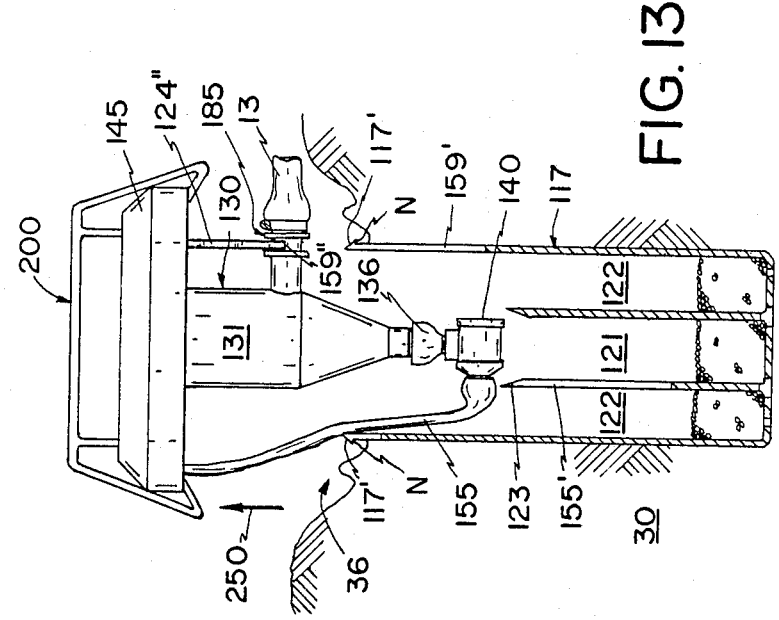
FIG. 13 is a section through the surrounding housing of FIG. 12 illustrating partial removal of the assembly for cleaning or repair.

The upper cylindrical margin of the housing 117 carries two diametrically opposed upright tag elements 117', see FIGS. 11, 13 and 14. The tag elements 117' have an upper bevelled surface inclined downwardly and outward, then reversed stepping inward to form a recess or notch N thereunder. It will be seen; therefore, that the compound nozzle valve assembly 115 is composed of the annular vent ring 145 which carries the nozzle valve member 130 and integrally therewith the vent 126, and the vent tube 155. The annular vent ring 145 snaps into engagement with the housing 117 when the tag elements 117' project through the slots 124' in the floor of the well 124 and are pushed into juxtaposition thus to spring back, into the position as seen in FIG. 11. Thus a tight juxtapositioned latch is formed to hold the annular vent ring 145, and the body member 130 to the housing 117 to form the complete compound nozzle valve assembly 115.

Figure 12:
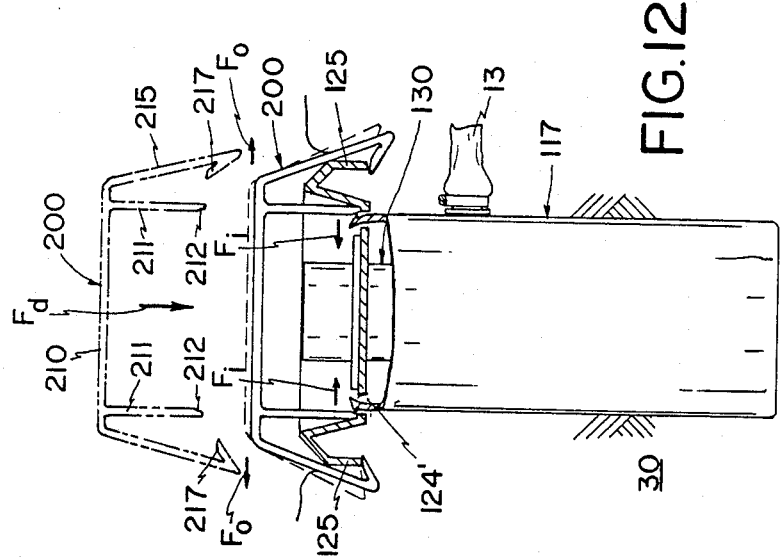
FIG. 12 is an elevational view, of the compound nozzle valve assembly of FIG. 11, the upper portion is partially in section, showing how the assembly is removably attached to its surrounding housing.

FIGS. 12 and 13, however, are depicted to show that, once the compound nozzle valve assembly 115 is placed into the ground, how the body 130 may be removed, simplistically, for servicing without major disruption to the surround. A specially formed extractor 200 of flexible or springable material such as plastic is formed generally as shown in FIGS. 12, 13 and 14 and consists of an upper handle portion 210 that extends near opposite ends into vertically depending rigid members 211 each with an inwardly bevelled tip 212. The dimensions between the opposite tips 212 is such, as clearly seen in FIG. 12, that when the extractor 200 is placed down from the phantom to the bold position in FIG. 12 (arrow $F_d$) and over the vent ring 145, the bevelled tips 112 engage and force the tag elements 117' toward each other, arrows $F_i$; to unlatch the notch N away from the body of the vent floor 124. The extractor 200 also extends slightly beyond the depending members 211 into downwardly inclined catch members 215 with reversely disposed distal tips 217. The relative distance between the two distal tips 217 is such that when the extractor 200 is placed over the vent ring 145, as shown in FIG. 12, the tips 217 move outwards, arrows $F_o$, (simultaneously as the bevelled tips 217 engage the tag elements 117') then snap back and engage the bottom of the peripheral margin of the vent ring 145, as shown in bold in FIG. 12.

Hence, now referring to FIG. 13, with a slightly upward movement, as shown by the arrow 250, the compound nozzle vent member 130 may be removed from its encompassing ground engaging housing 117. It will now be obvious to those skilled in the art that easily removal and servicing of the inner components of the body 130 can now take place.

In order to facilitate the foregoing, and referring to FIG. 13, it will be seen that there needs to be provided a vertically positioned (vent channel accommodating) slot 155' in the wall of the cylindrical piece 120 to accommodate the path of the vent channel 155; similarly a (water intake) accommodating slot 159' is provided in the housing body 117, all of which is more clearly seen with reference to FIG. 14. Thus, the annular vent ring 145 has as well, a downwardly depending finger piece 124" with nesting arcuate recess 159" at its distal end. The finger piece 124" mates snug within the housing slot 159' and the arcuate recess 159" sealingly rests against the upper surface of the water inlet channel 159, while the arcuate bottom of the housing slot 159' likewise urges, but against the lower portion of the inlet channel 159, when the body 130 and the housing 117 are intergally attached to one another, as in FIG. 11, to form the compound nozzle valve assembly 115. In order to assure that pieces or bits of earth from the surrounding ground 30 or 31 do not get into the annular region 122, the inlet water channel 159 is fitted with a double annular seal 185, which acts as a sealing member across the boundary of the housing 117 and the ground; this perfects isolation.

It will now be apparent to those skilled in the art, that if the valve of FIG. 9 is used in lieu of any of the valves of FIGS. 2 through 8, the need for the venting channel 155 and the vent 126 is avoided as is the need for the vent channel accommodating slot 155'.

Referring now to an alternative embodiment of water sensitive valve and to the FIGS. 15, 16 and 17, the body member 130 of a compound nozzle valve or irrigation head.

The body member 130 of a compound nozzel valve or irrigation head 115 shown in FIG. 11 is transformed so that the lower frusto-conical section 134 is restructured to depend into segment 534 as shown in FIG. 16 and thence at its lower extremity into cylindrical channel 535. The inner bore of the channel 535 steps radially at 536 into a seat of larger diameter than that defined by the majority of the channel 535.

Into the channel 535 the novel purge flap valve 540 is frictionally inserted. Specifically, the purge valve 540 encompasses a cylindrical housing 541 having near its upper end radially extending tags 542 adapted to index into seat 536 of the larger bore of the housing member 130. The outer circumference of the cylindrical member 541 has annular recess 543 at its lower end into which frictionally fits a resilient O-ring 544. Below the annular recess 543, the cylinder steps radially inward at 545 into a cylinder of smaller exterior diameter and displays a bulbus circumferential radial flange 546. This flange 546 acts a seat for a screen cap 560 which frictionally engages thereover. The screen cap 560 has a screen surface 561 which defines a plurality of water flow apertures 562 through which water, "W", passes and fits snug onto the out flow end 547 of the cylindrical housing 541. A similar cap 560' is affixed over the upper end of the cylindrical housing 541 and similarly mates with a corresponding circumferential projection 546'.

As more clearly seen in FIGS. 15 and 17, recessed from the upper perimeter of the cylinder 540 is a solid disc plate 570 that defines a central aperture 571. A flap or flex valve 580, disc like in shape and composed of resilient material carries on its lower surface four bulbous feet 581. That lower surface also defines a small annular protrusion 582 whose inner diameter is larger than the diameter of the central aperture 571 but concentric therewith. The outer diameter of the resilient flex valve 580 is smaller than the base 572 defined the cylinder 540 at this end.

Referring to FIG. 17 and the left portion thereof, from the center line "CL", illustrates when the irrigation system is charged with water and when the water pressure, "WP", is exerted by the arrows shown as such in FIG. 17 to deform the flexible disc 580 into the configuration shown thus mating the annular ring 582 against the rigid disc 570 to seal off the central aperture 571. When the water pressure "WP" is alleviated to a degree sufficient for the resilient disc 580 to resume its normal configuration, as shown on the right hand side of the center line "CL" in FIG. 17, water flows in accordance with the arrows "F", over the perimeter of the flexible disc 580, since its diameter is sized to be less than the central diameter of the channel 537. The water flows pass the perimeter of the disc plate 580 and then beneath the plate and between the bulbous feet 581 that engages the upper surface of the underlying solid disc plate 570 into the aperture 571 that is defined thereby; through the plenum "P" defined by the cylinder 540 to be purged out of the apertures 562 by the lower screen cap 560. The plenum "P" may have a porous material 549 therein such as an inorganic gauze or the like to inhibit the back flow of dirt from the surround into the frusto-conical member 130 housing the irrigation valve.

Referring to FIG. 16, the exterior diameter of the cylinder 540 and of the O-ring 544 are sized such that the O-ring frictionally engages against the bore 537 defined by the terminal end 535 of the frusto-conical member 534 and seals the same.

It will now be apparent that the unique water pressure responsive valve has applications other than in irrigation systems and may be used to purge water for virtually any application, either domestic, commercial or industrial, where that need is required for one reason or another.

It will now be apparent that various variations to the embodiments of the invention disclosed may be made without deviating from the intended invention as claimed.

The embodiments of the invention in which an exclusive property or privilege is claimed are defined as follows:

1. As an article of manufacture, a water relief and drainage valve for an irrigation system, the valve comprising;
   (a) a hollow housing partitioned to define,
      (i) a first water holding plenum;
      (ii) a second water discharge plenum including a discharge orifice whereby water in the second plenum is discharged therefrom;
      (iii) a channel communicating between both plenums whereby to convey water from the first plenum to the second plenum and hence, to discharge the same from the system;
   (b) a valve member disposed in said plenums and responsive to the ambient pressure of the water in said first plenum, the valve member including an upper flexible valve surface attached to the housing and extending through said first plenum to sealingly partition the said first plenum into an upper air accommodating subplenum, and a lower water accommodating subplenum;
      (i) the housing further defining a water conveying orifice communicating to the water accommodating subplenum, whereby the water accommodating orifice is adapted to be connected to the subterranean irrigation system;
      (ii) the housing further defining a second air venting orifice communicating with the upper air accommodating subplenum, whereby the air orifice is adapted to be continuously vented to the atmosphere;
   (d) a stem, with lower distal end, depending from the flexible valve membrane and extending through the channel, the stem of a diameter slightly smaller than that of the channel, whereby water in said water accommodating subplenum may flow past the stem, through the channel, into the second plenum, a valve head carried by the stem at the lower distal end of the stem and positioned so as to make urging closing contact against the channel and to sealingly close the same when the flexible membrane is deformed as a result of a differential in pressure across the flexible membrane as when the pressure in said water accommodating subplenum is greater than that in said air accommodating subplenum.

2. The valve as claimed in claim 1, further including an O ring carried by the housing, disposed circumferentially about the channel, but within the second plenum, and against which the valve head makes urging closing contact, when the pressure in the water containing subplenum is greater, by a predetermined threshold pressure, than that in the air containing subplenum, whereby a water impervious seal is thus formed to isolate the water containing plenums, from each other.

3. As an article of manufacture, a water relief and drainage valve for a subterranean irrigation system, the valve comprising,
   (a) a hollow housing partitioned to define,
      (i) a first water holding plenum, including an air venting orifice, and a water conveying orifice, communicating with the said first water holding plenum;
      (ii) a second water discharge plenum including a discharge orifice, whereby water in the second plenum is discharged therefrom;
      (iii) a channel communicating between both plenums whereby to convey water from the first plenum to the second plenum and hence to discharge the same from the system;
   (b) a compound valve member disposed in both plenums further comprising,
      (i) a piston member disposed in said first plenum;
      (ii) a stem carried by said piston member and depending therefrom and extending through the channel to a distal end disposed in said second plenum;
      (iii) a valve head carried by the stem at said distal end, and the specific gravity of the compound valve is less than 1;
   (c) a first sealing means disposed in said first plenum, circumferentially about said air venting orifice;
   (d) a second sealing means disposed in said second plenum, circumferentialy about said channel;
   (e) the compound valve dimensioned so that when the piston member makes urging mating contact with said first sealing means, the valve head likewise makes urging mating contact with said second sealing means, whereby the first and second plenums are respectively isolated, and the first plenum is simultaneously isolated from the air venting orifice.

4. The valve as claimed in claim 3, wherein the sealing means are O rings, and the first sealing means is of larger diameter than that of the second sealing means.

5. The valve as claimed in claim 2, including biasing means urging against the piston member to urge it away from said first sealing means, whereby to establish a predetermined threshold pressure which when exceeded causes the compound valve member to close against said air venting orifice and said channel.

6. As an article of manufacture, a water relief and drainage valve for an irrigation system, the valve comprising;
 (a) a cap portion defining a recess therein and carrying attachment means;
 (b) a hollow body partitioned to define,
  (i) a first water holding plenum and a water inlet channel communicating therewith and adapted to convey water into the water holding plenum;
  (ii) a second water discharge plenum including a discharge orifice whereby water in the second plenum is discharged therefrom;
  (iii) a channel communicating between both plenums whereby to convey water from the first plenum to the second plenum and hence, to discharge the same from the system;
  (iv) attachment means carried by the body for mating with the attachment means of said cap;
 (c) a flexible membrane sealingly mating with the cap and body when the cap is removably affixed onto the body by the respective attachment means whereby the flexible membrance and the cap define an air accommodating plenum;
 (d) a stem, with lower distal end, depending from the flexible membrane and extending through the channel, the stem of a diameter slightly smaller than that of the channel, whereby water in said water accommodating plenum may flow past the stem, through the channel, into the second plenum, a valve head carried by the stem at the lower distal end of the stem and positioned so as to make urging closing contact against the channel and to sealingly close the same when the flexible membrane is deformed as a result of a differential in pressure across the flexible membrane as when the pressure in said water accommodating plenum is greater than that in said air accommodating plenum.

7. The article as claimed in claim 6, wherein the cap defines a channel adapted for attachment to a vent whereby to maintain the pressure in the air accommodating plenum at a predetermined pressure, irrespective of the position of the flexible membrane.

8. The article as claimed in claim 6, including means for biasing the flexible member into a predetermined positon.

9. A compound nozzle and valve member suitable for use with an irrigation system and for draining the system of residual water, including water suspended solids, when the pressure of the water therein is below a predetermined pressure, the compound member comprising:
 (a) an essentially hollow rigid water containing body including;
  (i) an upper hollow water containing chamber defining;
   (1) a first water inlet channel adapted for communication to a source of water supply and for conveying water into the chamber;
   (2) a second water dispensing channel for conveying water, within the chamber, onto the surface of the ground for irrigation thereof;
   (3) a third water waste channel, disposed subjacent to both to both first and second channels;
  (ii) a water pressure sensitive valve housing a movable valve member, and communicating with the third waste channel, the valve member responsive to open the valve, when the water pressure within the chamber member is below a predetermined pressure, thereby to drain said chamber of water, and to close the valve when the water pressure in said chamber member is above said predetermined pressure, thereby inhibiting water from draining from the chamber member through the third channel, and thereby forcing water into said second water dispensing channel.

10. The compound nozzle and valve member as claimed in claim 9 including;
 (iii) a movable piston adapted to water sealingly travel through the chamber between a lower and an upper limit;
 (iv) a hollow stem, with distal and proximate ends, the proximate end attached to and communicating through the piston whereby to form said second channel;
 (v) a water dispensing nozzle carried by the distal end of the stem and communicating therewith for dispensing water in the chamber onto the surface of the ground; and,
 (vi) the second channel disposed between piston and third channel whereby, when water flows through the second channel into the chamber, the piston is driven to its upper limit and the water pressure within the chamber exceeds the predetermined pressure so long as the water is dispensed out the dispensing nozzle.

11. The compound nozzle and valve assembly as claimed in claim 10, wherein the water dispensing nozzle, is positioned, when the movable piston is at its upper limit, superadjacent the said member.

12. The compound nozzle and valve member as claimed in claim 10, wherein the hollow water containing chamber is essentially cylindrically formed.

13. A compound nozzle and valve assembly incorporating the compound nozzle and valve member as claimed in claim 10, and additionally comprising;
 (b) a ground engaging housing in which said compound nozzle and valve member nests, said housing defining in its lower portion a plurality of water draining orifices, and therein, a water porous media disposed subjacent to the water pressure sensitive valve whereby to allow waste water released from the waste channel to pass through the media and out of the housing into the ground.

14. A compound nozzle and valve assembly incorporating the compound nozzle and valve member as claimed in claim 10, and additionally comprising;
 (b) a ground engaging housing in which said compound nozzle and valve member nests, said housing defining in its lower portion a plurality of water draining orifices, and therein, a water porous media disposed subjacent to the water pressure sensitive valve whereby to allow waste water released from the waste channel to pass through the media and out of the housing into the ground, the housing and assembly respectively carrying releasing attachment means whereby the attachment means constrain the assembly for removably nesting the same within the housing.

15. A compound nozzle and valve assembly incorporating the compound nozzle and valve member as claimed in claim 10, and additionally comprising;
   (b) a ground engaging housing in which said compound nozzle and valve member nests, said housing defining in its lower portion a plurality of water draining orifices, and therein, a water porous media disposed subjacent to the water pressure sensitive valve whereby to allow waste water released from the waste channel to pass through the media and out of the housing into the ground; and,
the hollow water containing chamber is essentially cylindrical as is the housing.

16. A compound nozzle and valve assembly incorporating the compound nozzle and valve member as claimed in claim 10, and additionally comprising;
   (b) a ground engaging housing in which said compound nozzle and valve member nests, said housing defining in its lower portion a plurality of water draining orifices, and therein, a water porous media disposed subjacent to the water pressure sensitive valve whereby to allow waste water released from the waste channel to pass through the media and out of the housing into the ground, the housing and assembly respectively carrying releasing attachment means whereby the attachment means constrain the assembly for removably nesting the same within the housing; and,
the hollow water containing chamber is essentially cylindrical as is the housing.

17. The compound nozzle as claimed in claim 10 wherein the water pressure sensitive valve comprises an open ended housing defining:
   (a) a first water inflow orifice;
   (b) a second water outflow orifice communicating with the first water inflow orifice;
   (c) the housing extending near the first water inflow orifice into a surround circumscribing the first water inflow orifice and defining between that orifice and the housing a bearing surface;
   (d) a resilient flexible sheet positioned over said first water inflow orifice;
   (e) means for mounting said sheet, in a position upstream from said first water inflow orifice and in close proximity with said bearing surface whereby when water pressure reaches a certain predetermined threshold, the flexible sheet flexes to urge against the first water inflow orifice and to close off the same.

18. The compound nozzle as claimed in claim 17 wherein the resilient flexible sheet is carried by the bearing surface.

19. The compound nozzle as claimed in claim 17 wherein the housing is cylindrical and the bearing surface is annular.

20. The compound nozzle as claimed in claim 18 wherein the flexible sheet is a disc defining, on one surface, bulbus feet protruding therefrom, and a central protruding annula, the disc side to seat onto the bearings surface and the diameter of the annula is larger than the diameter of the first water inflow orifice 21. The compound nozzle as claimed in claim 18, including screen means mounted upstream from the first water inflow orifice and down so as to prohibit the flow of contaminates therethrough.

22. The compound nozzle as claimed in claim 18, including screen means mounted upstream from the first water inflow orifice and down so as to prohibit the flow of contaminates therethrough and flexible sheet is a disc defining, on one surface, bulbus feet protruding therefrom, and a central protruding annula, the disc side to seat onto the bearings surface and the diameter of the annula is larger than the diameter of the first water inflow orifice.

* * * * *